No. 859,378. PATENTED JULY 9, 1907.
C. R. FLEISCHMAN.
BALL.
APPLICATION FILED MAY 11, 1906.
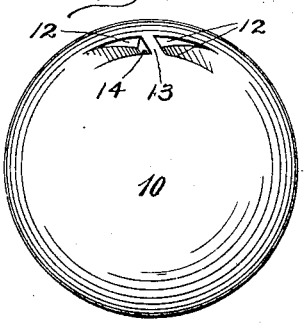
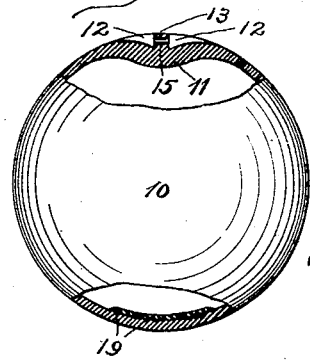
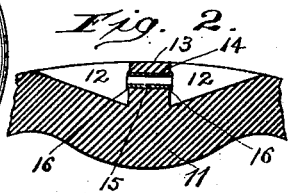
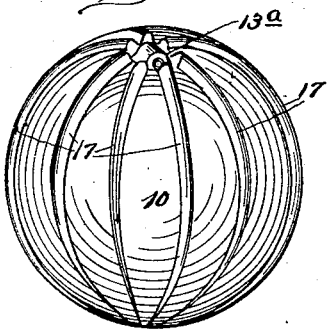
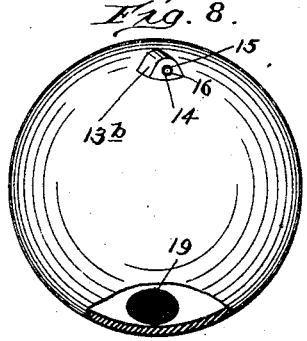
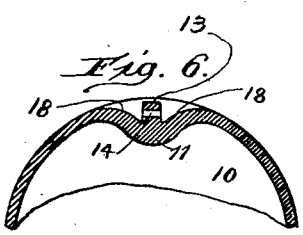
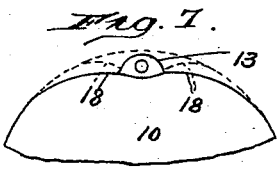
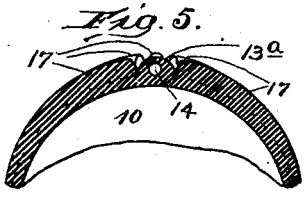
Witnesses:
Chas. E. Gorton
M. A. Nyman
Inventor:
Charles R. Fleischman
By Chas. C. Tillman
Atty.

UNITED STATES PATENT OFFICE.

CHARLES R. FLEISCHMAN, OF CHICAGO, ILLINOIS.

BALL.

No. 859,378.    Specification of Letters Patent.    Patented July 9, 1907.

Application filed May 11, 1906. Serial No. 316,247.

*To all whom it may concern:*

Be it known that I, CHARLES R. FLEISCHMAN, a citizen of the United States, residing at Chicago, in the county of Cook and State of Illinois, have invented certain new and useful Improvements in Balls, of which the following is a specification.

This invention relates to improvements in balls, and while it is more especially intended for use in that type known as inflated balls, which are made of soft rubber or other flexible and air-tight material, and are inflated to give them the necessary or desired resiliency and rebounding quality, yet it is also applicable to balls of other character and material, and it consists in certain peculiarities of the construction, novel arrangement, and operation of the parts thereof, as will be hereinafter more fully set forth and specifically claimed.

The principal object of the invention is to provide a ball which shall be so constructed as to furnish simple, inexpensive and efficient means for easily attaching a cord or other flexible connection thereto, in such a manner that the air chamber of the ball will remain air-tight, and the liability of that portion of the ball to which the cord is attached being torn out by a great strain, will be reduced to a minimum.

Another object of the invention is to provide means for preventing deflection in the movement of the ball, should it strike an object with its portion to which the cord is attached.

Various other objects and advantages will be disclosed in the subjoined description and explanation.

In order to enable others skilled in the art to which my invention pertains, to make and use the same, I will now proceed to describe it referring to the accompanying drawing, in which—

Figure 1 is a perspective view of a ball embodying one form of the invention. Fig. 2 is a greatly enlarged sectional view taken longitudinally through the recessed part of the ball. Fig. 3 is a view partly in elevation and partly in section, showing the cord attaching means illustrated in Figs. 1 and 2, and illustrating means for automatically sealing the ball after it has been inflated. Fig. 4 is a perspective view illustrating a modification in the construction of the cord attaching extension, as well as in the form of the body of the ball. Fig. 5 is a sectional view of a portion of the ball shown in Fig. 4, taken transversely through the cord attaching extension. Fig. 6 is a fragmental sectional view illustrating another modified form of the ball. Fig. 7 is a fragmental view in elevation of the ball illustrated in Fig. 6, illustrating by dotted lines the natural position of the parts and by continuous lines the position thereof when it is compressed or depressed so that the opening can be formed in the cord attaching extension, or the cord inserted in said opening;—and—Fig. 8 is a perspective view illustrating still another modification in the construction of the cord attaching extension.

Like numerals of reference, refer to corresponding parts throughout the different views of the drawing.

The reference numeral 10 designates the ball, which is preferably made of soft rubber, but in some instances may be made of semi-solid material such as sponge-like rubber, and has in the outer surface of the thickened part 11 of its wall alined recesses 12, which are divided by means of a cord attaching extension 13, which extends transversely across the recesses 12 and is formed integrally with the thickened or re-inforced portion 11 and side walls of the recesses 12, which portion and side walls constitute a part of the wall of the ball. As shown in Figs. 1 to 3, inclusive, the extension 13 is provided with a transverse opening 14, in which is located a short tube or eyelet 15, of metal, through which the cord may be passed and attached. This tube or eyelet has an annular flange 16 on each of its ends to hold it in position within the opening 14 of the extension 13 and also to prevent its edges cutting or wearing the cord, and is employed to prevent the cord cutting through the extension 13 or unduly stretching the same. As shown in Figs. 1, 2 and 3 of the drawings, the recesses or depressions 12 are deepest at their inner ends or the ends thereof adjacent to the extension 13, and gradually grow shallower towards their outer ends, and that the upper surface of the extension 13 is flush with the upper surface of the side walls of said recesses, thus presenting practically a circular surface against which the ball may strike without deflecting the movement thereof.

In Figs. 4 and 5 is shown a modification in the construction of the ball, which consists in forming it with an apertured extension 13ª which projects outwardly from the surface of the body of the ball, as shown, and a series of ribs 17 which extend circumferentially on the outer surface of the ball from the extension 13ª to a point diametrically opposite the same. As shown in the last-named figures of the drawing, that portion of the ball on which the extension 13ª is formed or provided is thickened or re-inforced, and that the ribs 17 increase in size as they approach said extension, yet diminish towards their other ends. It will also be observed by reference to Fig. 4, that the ends of the ribs 17 adjacent to the extension 13ª are not connected to said extension but terminate short thereof so as to provide spaces between said ends and the extension so as to permit of the insertion of the cord through the opening 14 therein, yet that said ends of the ribs are of about the same height as the extension 13ª so that should the ball strike an object with said portion the movement thereof will not be deflected.

In Figs. 6 and 7 is shown still another modification in which the ball 10 is provided with a circular depression 18, from the center of which rises an apertured extension 13 which projects at its outer end to a line about flush with the rim of said depression. It is apparent when this modified form is employed, the rim of the depression 18 may be depressed to the position shown by continuous lines in Fig. 7, which operation will expose the projection 13 and permit it to be pierced or to allow the cord to be passed through the opening therein.

In Fig. 8 is shown still another modification in the construction of the ball, which consists in omitting the depression or recesses from the outer surface of the ball and forming or providing said surface with an extension 13ᵇ, which has an opening 14 through which the cord may be passed and fastened. In this last-named modification, it is apparent that, that portion of the ball on which the extension 13ᵇ is located may be thickened or re-inforced so as to strengthen the ball at said point. As the thickened portion of the ball will have a tendency to overbalance the same, I may use as a counterbalance therefor, as well as for the purpose of sealing the puncture or punctures made by a hollow needle or instrument used for inflating the ball, a piece of para or pure rubber 19, which is located diametrically opposite the central portion of the thickened part or re-inforcement, as is clearly shown in Figs. 3 and 8 of the drawing. It is evident that I may or may not use the short tube or eyelet 15 in the openings of the cord engaging extensions, but prefer to use the same on account of the durability afforded the parts by the employment thereof.

Having thus fully described my invention what I claim as new and desire to secure by Letters-Patent, is—

1. A hollow ball made of soft rubber and having integral with the wall thereof a cord engaging extension, substantially as described.

2. A hollow ball made of soft rubber and having integral with the wall thereof an apertured extension for engagement with a cord, substantially as described.

3. A ball having in its outer surface a depression and an apertured cord engaging extension located within said depression and extended at its outer end flush with the portion of the ball surrounding the depression, substantially as described.

4. A ball having in its outer surface a depression and an apertured cord engaging extension located in said depression and extending at its free end flush with the portion of the ball surrounding the depression, and an eyelet located in the aperture of said extension, substantially as described.

5. A ball having a portion of its wall thickened and provided on the outer surface of said thickened portion with a depression, an apertured extension located in said depression and extending at its free end outwardly so as to be about flush with the portion of the ball surrounding the depression, substantially as described.

6. A ball having in its outer surface alined recesses and an apertured extension located transversely between said recesses and formed integrally with the side walls and bottom thereof, substantially as described.

CHARLES R. FLEISCHMAN.

Witnesses:
M. A. WYMAN,
CHAS. C. TILLMAN.